(12) United States Patent
Rodgers

(10) Patent No.: US 6,428,230 B2
(45) Date of Patent: Aug. 6, 2002

(54) COOKING APPARATUS

(75) Inventor: Tommie Rodgers, Highland Park, IL (US)

(73) Assignee: Tommie E. Rodgers, Highland Park, IL (US)

( * ) Notice: Subject to any disclaimer, the term of this patent is extended or adjusted under 35 U.S.C. 154(b) by 0 days.

(21) Appl. No.: 09/888,172

(22) Filed: Jun. 22, 2001

Related U.S. Application Data

(60) Provisional application No. 60/213,439, filed on Jun. 22, 2000.

(51) Int. Cl.[7] .................................................. B05C 1/00

(52) U.S. Cl. .......................................... 401/17; 401/24

(58) Field of Search ........................ 401/16–19, 21–25, 401/34, 36, 44, 47, 291

(56) References Cited

U.S. PATENT DOCUMENTS

| | | | | |
|---|---|---|---|---|
| 1,813,616 A | * | 7/1931 | Frazier | 401/17 |
| 4,457,454 A | | 7/1984 | Meshberg | |
| 4,932,802 A | * | 6/1990 | Cantone | 401/23 |
| 5,186,559 A | * | 2/1993 | Fu | 401/47 |
| 5,655,554 A | * | 8/1997 | Goldberg | 401/34 |
| 5,762,077 A | * | 6/1998 | Griffiths, Jr. | 401/108 |
| 6,123,477 A | * | 9/2000 | Hecker | 401/291 |

* cited by examiner

*Primary Examiner*—Charles R. Eloshway

(57) ABSTRACT

A new and improved apparatus for assisting a user while cooking on an outdoor grill or other cooking surface. The apparatus comprises a cylindrical tube approximately fifteen inches in length and four inches in diameter. The apparatus has two separate and distinct compartments for holding a condiment and water. The apparatus further has structure enabling the user to apply the water and the condiment onto a grill or piece of food being cooked.

4 Claims, 2 Drawing Sheets

COOKING APPARATUS

This application claims benefit to U.S. application Ser. No. 60/213,439, filed Jun. 22, 2000.

I. BACKGROUND OF THE INVENTION

The present invention is that of a new and improved apparatus for assisting a user while cooking on an outdoor grill or other cooking surface.

II. DESCRIPTION OF THE PRIOR ART

U.S. Pat. No. 5,186,559, issued to Fu, discloses a cooking dispenser comprising an assembly of one or more tubular, squeezable containers having a circular opening in a plane at an oblique angle to the axis of the container and connected rotatably to a collar having a flow passage for each container.

U.S. Pat. No. 4,457,454, issued to Meshberg, discloses a two-compartment dispenser of fluent material which includes a primary compartment having a collapsible wall and initially holding the main body of the material, a secondary compartment, and a compartment separator that forms a barrier between the two compartments and has a passage for the fluent material to flow from the primary to the secondary compartment.

III. SUMMARY OF THE INVENTION

The present invention is that of a new and improved apparatus for assisting a user while cooking on an outdoor grill or other cooking surface. The apparatus would be cylindrical tube that would be approximately fifteen inches in length and about four inches in diameter. The apparatus would have two separate and distinct compartments in which a user would store both a condiment and water and would have mechanism to apply the stored items from one or more both compartments onto a grill or piece of food being cooked.

There has thus been outlined, rather broadly, the more important features of a cooking apparatus in order that the detailed description thereof that follows may be better understood and in order that the present contribution to the art may be better appreciated. There are, of course, additional features of the cooking apparatus that will be described hereinafter and which will form the subject matter of the claims appended hereto.

In this respect, before explaining at least one embodiment of the cooking apparatus in detail, it is to be understood that the cooking apparatus is not limited in its application to the details of construction and to the arrangements of the components set forth in the following description or illustrated in the drawings. The cooking apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present cooking apparatus. It is important, therefore, that the claims be regarded as including such equivalent constructions insofar as they do not depart from the spirit and scope of the present invention.

It is therefore an object of the present invention to provide a cooking apparatus which has all of the advantages of the prior art and none of the disadvantages.

It is another object of the present invention to provide a cooking apparatus which may be easily and efficiently manufactured and marketed.

It is another object of the present invention to provide a cooking apparatus which is of durable and reliable construction.

It is yet another object of the present invention to provide a cooking apparatus which is economically affordable and available for relevant purchasing government entities.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
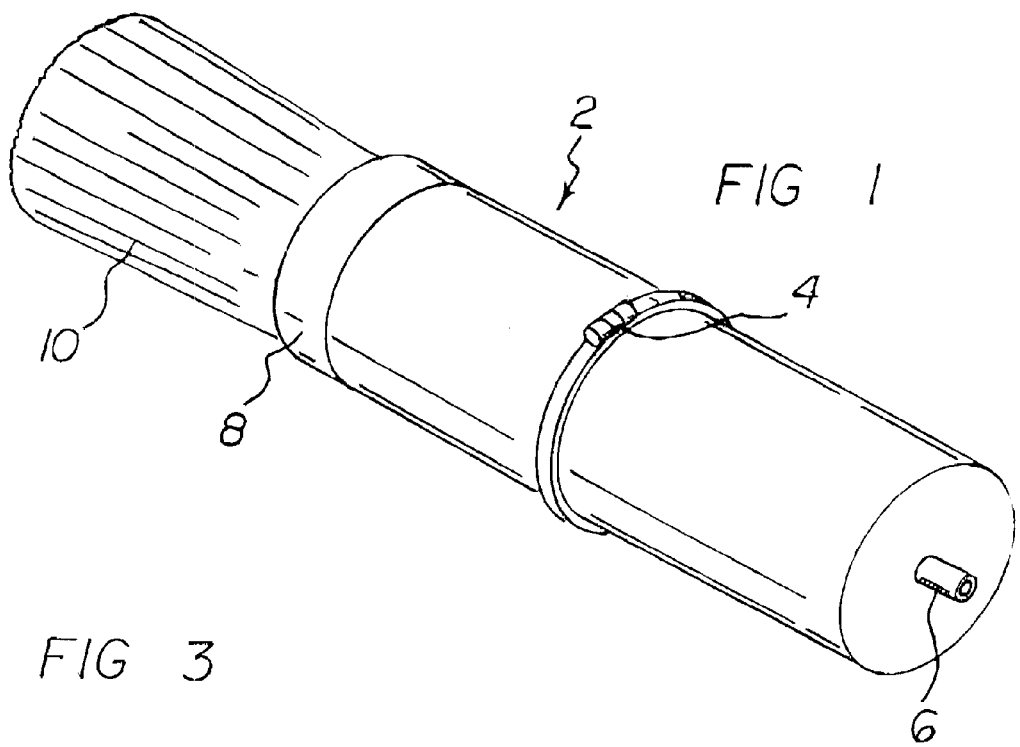
FIG. 1 shows a perspective view of the present invention.
Figure 2:
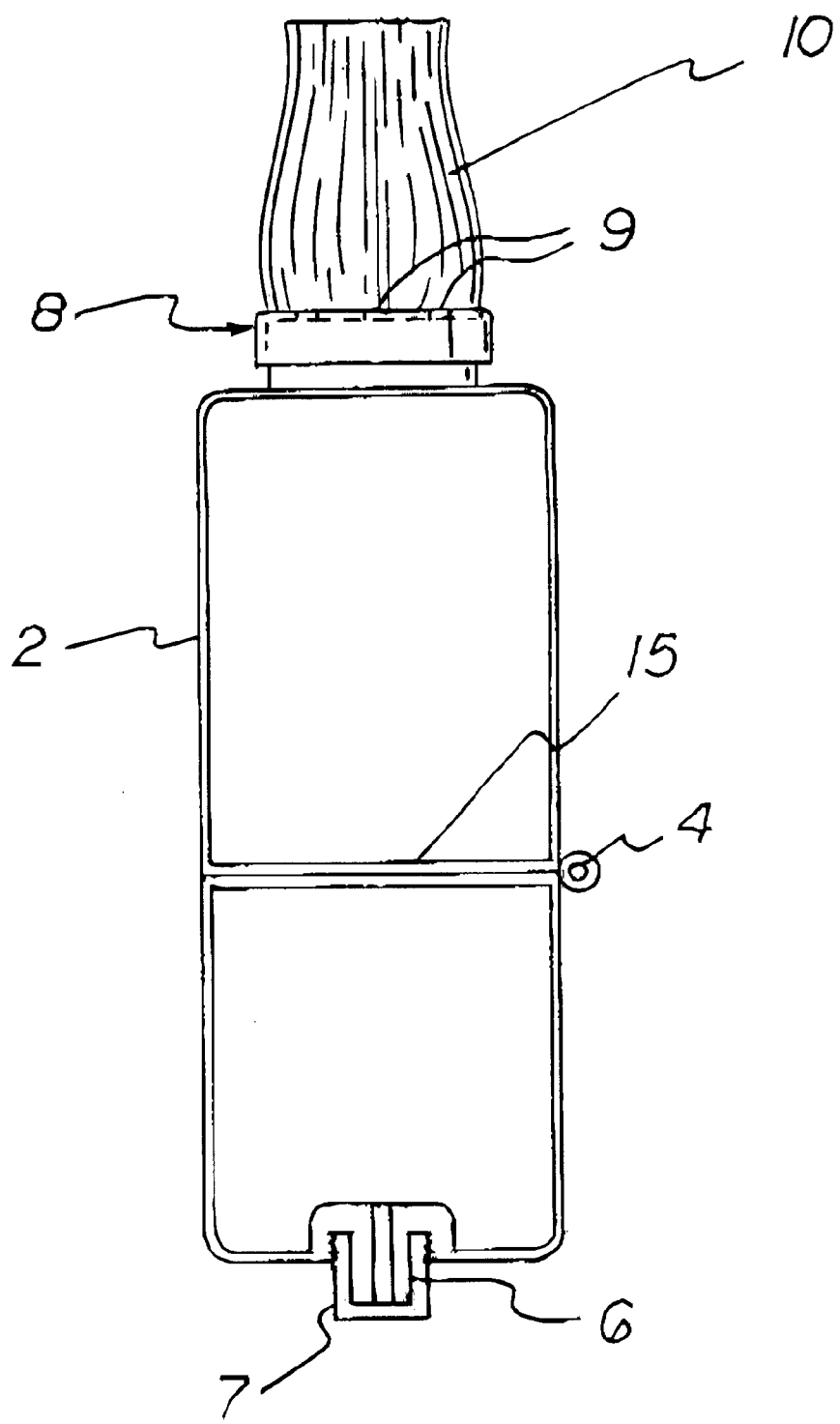
FIG. 2 shows a side view of the present invention.

FIGS. 1 and 2 show perspective and side views, respectively, of applicator 2. Applicator 2 has two sections, a first section and a second section. The first section of applicator 2 has two ends, a first end and second end, while the second section of applicator 2 has two ends, a first end and a second end. Each section is a roughly cylindrical shape and fabricated from pliable material. The first end of the first section is pivotally connected to the first end of the second section by hinge 4. Divider 15 separates the first section of applicator 2 from the second section. Applicator 2 would be approximately fifteen inches in length and approximately four inches in width.

The first section of the present invention would preferably be used to contain water so that a user would be able to use this water to cool down a grill that he or she would be cooking on. The second end of the first section would contain a water outlet nozzle 6, which would allow a user to squirt water from the first section of the present invention to any desired location. Nozzle 6 would include a screw-off cap 7 to use when a user would not be using the water within the first section of applicator 2.

The second end of the second section of the present invention would have end-mounted brush 8, with brush 8 including a plurality of bristles 10 located on the top surface of brush 8. Brush 8 would be removably attached to the second end of the second section of applicator 2 and would have a plurality of holes 9 on its surface.

The inside of the second section would preferably be used to contain barbecue sauce or another type of sauce that a user would be able to use to apply to food cooking on a grill. When the second section would be squeezed, some barbecue sauce would exit through the top surface of brush 8 through the plurality of holes 9 and onto bristles 10. Once this would occur, the bristles 10 could be used to apply barbecue sauce or other appropriate condiment chosen by a user.

If desired, hinge 4 could be removed, allowing a user to separate the first section of applicator 2 from the second section of applicator 2. This would allow for greater versatility of the present invention and would increase demand for applicator 2.

Figure 3:
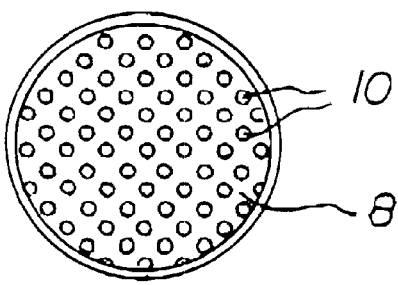
FIG. 3 shows a top view of the top surface of brush used with the present invention.

FIG. 3 shows a top view of the top surface of brush 8 of the present invention. In this diagram, the plurality of bristles 10 have been removed, which allows a user to see the plurality of holes 9 where the barbecue sauce or other condiment located in the second section of the present invention would exit the second section of applicator 2 when squeezed.

Figure 4:
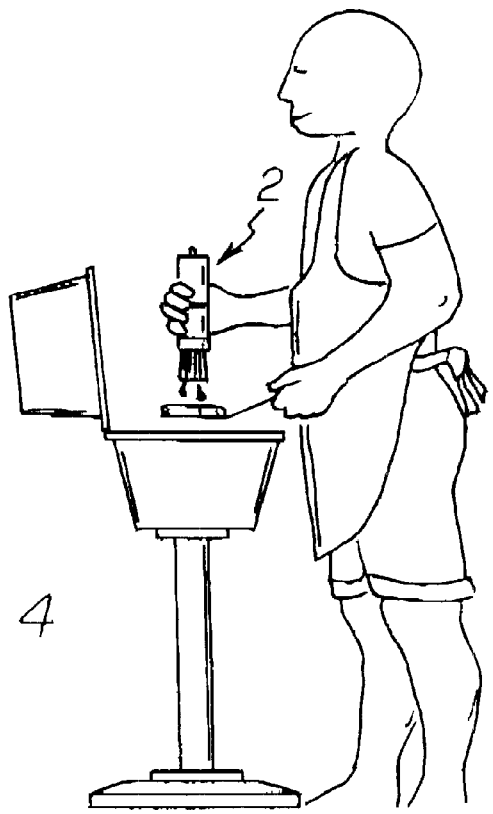
FIG. 4 shows the present invention as it would appear in use.

FIG. 4 shows the present invention in use. In this diagram, a user is using the second section of the present invention to apply a condiment to a piece of meat. The user could also turn applicator 2 of the present invention around by 180 degrees and apply water to the grill if a user thought the grill was perhaps too hot.

What I claim as my invention is:

1. A cooking apparatus comprising:
    (a) a first compartment having two ends, a first end and a second end, the first compartment being cylindrical, the compartment being approximately seven and one-half inches in length and approximately four inches in diameter, the first end of the first compartment being open, the first compartment being pliable
    (b) a brush cap attached to the first end of the first compartment, the brush cap having two sides, an inner side and an outer side, the brush cap including a plurality of holes evenly dispersed thereon,
    (c) a plurality of bristles attached to the outer side of the brush cap,
    (d) a second compartment having two ends, a first end and a second end, the second compartment being cylindrical, the compartment being approximately seven and one-half inches in length and approximately four inches in diameter, the second compartment being pliable, the second end of the second compartment pivotally attached to the second end of the first compartment, and
    (e) a nozzle attached to the first end of the second compartment.

2. A cooking apparatus according to claim 1 wherein the cooking apparatus further comprises:
    (a) a volume of condiment located within the first compartment, and
    (b) a volume of water located within the second compartment.

3. A method for using the cooking apparatus according to claim 2 comprising the steps of: applying the volume of condiment, as needed, on items being cooked by squeezing the first compartment, allowing some of the volume of condiment to exit the plurality of holes and onto the plurality of bristles, and applying a volume of water, as needed, on items being cooked or on a hot grill by squeezing the second compartment, allowing some of the volume of water within the second compartment to exit the nozzle.

4. A cooking apparatus according to claim 1 wherein the second end of the second compartment is pivotally attached to the second end of the first compartment by a hinge.

* * * * *